United States Patent [19]

Schwarzenbek

[11] 4,090,948

[45] May 23, 1978

[54] CATALYTIC CRACKING PROCESS

[76] Inventor: Eugene F. Schwarzenbek, 3 Seacrest Dr., Lavallette, N.J. 08735

[21] Appl. No.: 760,247

[22] Filed: Jan. 17, 1977

[51] Int. Cl.² .................. B01J 8/24; C10G 37/02; C10G 11/04
[52] U.S. Cl. ........................ 208/74; 208/78; 208/113; 208/120; 208/164; 208/254 R
[58] Field of Search ............ 208/113, 120, 74, 78, 208/164

[56] References Cited

U.S. PATENT DOCUMENTS

| | | | |
|---|---|---|---|
| 2,379,159 | 6/1945 | Kanhofer | 208/74 |
| 3,186,805 | 6/1965 | Gomory | 208/74 X |
| 3,380,911 | 4/1968 | Owen | 208/74 |
| 3,639,228 | 2/1972 | Carr et al. | 208/120 X |
| 3,679,576 | 7/1972 | McDonald | 208/74 |
| 3,812,029 | 5/1974 | Snyder | 208/113 |
| 3,888,762 | 6/1975 | Gerhold | 208/120 |
| 3,997,428 | 12/1976 | McKenna | 208/78 |

*Primary Examiner*—Delbert E. Gantz
*Assistant Examiner*—G. E. Schmitkons

[57] ABSTRACT

An improvement in the fluid cracking process is obtained by contacting the hydrocarbon feed in a riser reaction zone first with a recycled coke-containing spent catalyst and then contacting the resultant mixture with freshly regenerated catalyst to produce the desired conversion of the hydrocarbon feed and a coke-containing spent catalyst, a portion of the spent catalyst being recycled without regeneration to the inlet of the reaction zone and the remainder being regenerated and returned to an intermediate point in the reaction zone. The recycled coke-containing spent catalyst has sufficient activity so that the highly reactive nitrogen and carbon residue containing hydrocarbon contaminants in the oil feed will deposit on the spent catalyst and thus minimize the deactivation of the freshly regenerated catalyst used in the subsequent cracking of the oil feed.

By contacting the oil feed first with the recycled spent catalyst, this invention allows the refiner to utilize the full activity and selectivity characteristics of the freshly regenerated catalyst in order to obtain higher yields of the desired products from the cracking operations.

10 Claims, 1 Drawing Figure

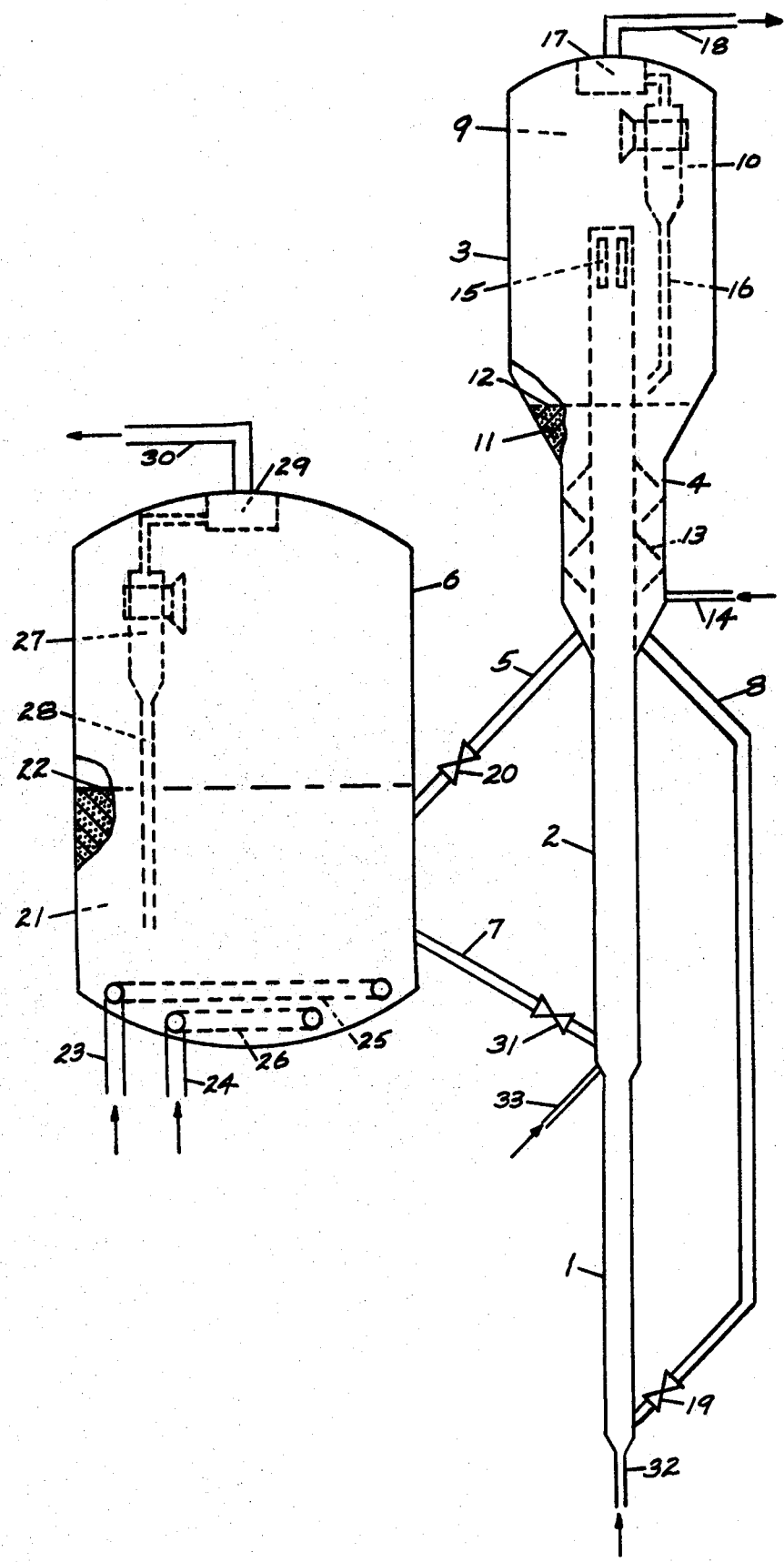

CATALYTIC CRACKING PROCESS

BACKGROUND OF THE INVENTION

1. Field of the Invention

This invention pertains to the field of hydrocarbon processing. The invention pertains, in particular, to a fluid catalyst cracking process in which the method of contacting of the oil feed with a recycled spent catalyst and freshly regenerated catalyst results in an improved product distribution from the cracking operation.

2. Description of the Prior Art

In the fluid catalyst cracking process, liquid or partially vaporized hydrocarbon feed stock generally contacts hot freshly regenerated catalyst in the lower section of a riser reaction zone. The amount of regenerated catalyst employed is sufficient to supply the heat of vaporization of the oil feed, the endothermic heat of cracking, and the sensible heat required to carry out the cracking reaction at the desired operating temperature. The mixture of oil vapor and catalyst flows up through the high velocity riser, where cracking to the desired lighter products and to coke deposited on the catalyst occurs. The desired conversion of the oil feed may occur completely in the riser, or this conversion may be incomplete and the additional desired conversion may occur in a low velocity fluid catalyst bed superimposed on top of the riser reaction section. The vapor from the cracking section may flow directly to a cyclone separator, but more generally into a disengaging space and then to a cyclone separator system where hydrocarbon vapors are separated from the spent catalyst. The separated hydrocarbon vapors then flow to a main fractionator where they are separated into such typical fractions as a light gas and gasoline overhead, light cycle oil and heavy cycle oil sidestreams, and a bottom stream which contains fine catalyst which was not collected in the cyclone separator system. The bottom stream is settled in the bottom section of the fractionator or in a separate settler to produce a decanted oil fraction and a slurry oil which is returned to either the inlet or outlet of the reaction zone to recover the entrained catalyst fines. Some of the products from the main fractionator may flow to additional recovery equipment where additional separation and purification steps are carried out. The spent catalyst separated from the hydrocarbon vapors in the disengaging zone and cyclone separator system flows to a stripper where the countercurrent flow of steam removes absorbed and interstitial hydrocarbons from the catalyst. The stripped catalyst flows through a standpipe and a controlled slide valve either directly as a dense phase to the regenerator or it may be transported by air to the regenerator. The catalyst in the regenerator is usually maintained as a dense fluid bed, although transport type regeneration or multiple bed type regeneration may be employed. In the regenerator, the catalyst contacts oxygen containing gas which burns the freshly deposited coke from the catalyst.

Flue gas from the burning of coke flows through a dilute phase disengaging zone to a cyclone separator system where the entrained catalyst is recovered and returned to the regenerator bed. The flue gas usually contains carbon monoxide, carbon dioxide, steam, nitrogen and a small amount of oxygen. This gas flows to a flue gas boiler where the carbon monoxide is burned and the resultant heat recovered. Alternatively, the conditions in the catalyst regeneration zone may be so controlled that essentially complete burning of the carbon monoxide is obtained. This can be accomplished by extensive burning of the carbon monoxide in the dilute phase section of the regenerator or by the use of special catalysts containing an additive which promotes the burning of the carbon monoxide to carbon dioxide within the catalyst bed. The amount of air fed to the regenerator is sufficient to burn all the coke deposited in the reaction section and to maintain the residual carbon on the regenerated catalyst at a low level. The freshly regenerated catalyst flows from the regenerator bed through a standpipe and controlled slide valve to the bottom section of the reaction zone where, as previously mentioned, it contacts the feed stock to be cracked.

In these typical fluid catalytic cracking operations, the virgin feed stock to be cracked always contacts the freshly regenerated catalyst with the result that the highly reactive coke producing contaminants in the feed readily deposit on the catalyst and destroy a substantial portion of the activity of the catalyst before any extensive cracking of the feed occurs. As a result, the bulk of the desired conversion of the oil feed is carried out with a partially deactivated catalyst with the result that more severe operating conditions are required and the selectivity of the cracking operation to produce the desired gasoline product is impaired.

In the practice of my invention, the feed is first contacted with a partially spent catalyst, and then with a freshly regenerated catalyst. As a result of this method of contacting, the highly reactive contaminants in the feed are deposited on the spent catalyst with the result that the bulk of the desired cracking is then subsequently carried out with a highly reactive and selective regenerated catalyst free of these oil contaminants. The so-called spent catalyst contacted with the fresh feed is still sufficiently active to react with the contaminants in the feed without resulting in any substantial cracking of the bulk of the hydrocarbon in the feed. Carrying out the major portion of the cracking with a catalyst essentially free of these undesirable contaminants in the feed results in a more extensive and more selective cracking operation in which higher yields of the more desired products are obtained.

The following listing of patents include relevant teachings considered by applicant as prior art:

U.S. Pat. No. 2,312,230 — Class 208/157
U.S. Pat. No. 2,439,811 — Class 208/74
U.S. Pat. No. 2,487,132 — Class 208/150
U.S. Pat. No. 2,700,015 — Class 208/150
U.S. Pat. No. 2,847,364 — Class 208/59
U.S. Pat. No. 2,892,773 — Class 208/213
U.S. Pat. No. 2,965,454 — Class 23/288
U.S. Pat. No. 3,071,538 — Class 208/120
U.S. Pat. No. 3,182,011 — Class 208/78
U.S. Pat. No. 3,344,060 — Class 208/140
U.S. Pat. No. 3,380,911 — Class 208/74
U.S. Pat. No. 3,679,576 — Class 208/74
U.S. Pat. No. 3,888,762 — Class 208/120

SUMMARY OF THE INVENTION

This invention is a fluid catalytic cracking process in which the deleterious effects of certain contaminants in the oil feed are minimized by contacting the oil feed with recycled spent catalyst before contacting with freshly regenerated catalyst.

In a broad embodiment, my invention results in a higher conversion of the oil feed and a more desirable product yield structure by carrying out the catalytic cracking operations in steps comprising (a) contacting the hydrocarbon oil feed in a riser cracking zone with sufficient recycled spent catalyst to vaporize the oil feed and deposit on the recycled catalyst a major portion of certain contaminants in the feed; (b) contacting the oil feed and recycled spent catalyst mixture in a second reaction zone with sufficient freshly regenerated catalyst to obtain the desired conversion of and product yield structure from the oil feed, including the deposition of coke on the freshly regenerated catalyst to form spent catalyst; (c) discharging the mixture from the reaction zone into a separation zone to effect separation of catalyst from hydrocarbon product components; (d) passing hydrocarbon products from said separation zone to a main fractionator where desired product and unreacted feed streams are recovered, including a heavy oil slurry stream containing entrained spent catalyst which is returned to the separator zone; (e) passing spent catalyst from the separator zone of step (c) to a spent catalyst stripping zone to remove interstitial and absorbed hydrocarbons therefrom to form stripped spent catalyst containing coke deposited in reaction zone steps (a) and (b); (f) passing a first portion of stripped spent catalyst from the stripping zone to a regeneration zone wherein coke is oxidized therefrom to produce freshly regenerated catalyst; (g) passing freshly regenerated catalyst from said regeneration zone to the second reaction zone of step (b) above; (h) passing a second portion of stripped spent catalyst from the stripping zone to the primary reaction zone of step (a) above in an amount to vaporize the oil feed and effectively deposit the contaminants in the oil feed on said recycled spent catalyst.

BRIEF DESCRIPTION OF DRAWING

The attached single drawing shows the essential features of the process of my invention, including riser reaction zones 1 and 2, vessel 3, spent catalyst stripping zone 4, spent catalyst standpipe 5, regenerator 6, freshly regenerated catalyst standpipe 7, and recycle catalyst standpipe 8 which is connected between spent catalyst stripping zone 4 and the bottom section of reaction zone 1.

The riser reaction zone 1 is connected to riser reaction zone 2 which is, in turn, connected to vessel 3, as shown in the drawing. Vessel 3 contains a separator zone 9 in which cyclone separators typical of 10 are located, a bed of catalyst 11 having an interface at 12, and a spent catalyst stripping zone 4 which contains baffles 13 into which flows steam as a stripping medium through feed line 14. The top of riser reaction zone 2 is capped and has exit slots 15 around the periphery of the pipe directing the spent catalyst flow horizontally and then downward to stripping zone 4. The cyclone separators 10 have diplegs 16 which pass catalyst entrained with the effluent vapor from reaction zone 2 and separated from these vapors in the cyclone separator downward toward the stripper catalyst bed. Hydrocarbon vapors and steam pass out of the cyclone separators through a plenum chamber 17 and vapor outlet line 18 to the main fractionator not shown in the drawing.

Recycle catalyst standpipe 8 contains a slide valve 19 which controls the rate of flow of spent catalyst to the base of riser reaction zone 1.

Spent catalyst standpipe 5 connects vessel 3 and regenerator 6. The conduit contains a slide valve 20 which maintains flow of catalyst from the stripping zone 4 within vessel 3 to regenerator 6.

Regeneration zone 6 contains a fluid bed of catalyst 21 with an interface 22. Air to effect combustion of coke in the bed flows through lines 23 and 24 and is distributed across the cross-sectional area of the bed by distributor pipes or rings 25 and 26. Flue gas flows to cyclone separator 27 which separates entrained catalyst which is returned to the regenerator bed 21 via dipleg 28. The separated flue gas flows through plenum chamber 29 and exits via outlet line 30. The freshly regenerated catalyst flows through the regenerated catalyst standpipe 7 to the base of reaction zone 2. The flow of regenerated catalyst is controlled by slide valve 31 located in regenerated catalyst standpipe 7.

At the bottom of the primary reaction zone 1 is a hydrocarbon feed inlet 32 through which fresh feed enters contacting recycled spent catalyst. The feed is vaporized and the resultant vapors carry the recycled spent catalyst upward through reaction zone 1. There is added at the base of reaction zone 2 freshly regenerated catalyst via conduit 7 and any partially cracked feed or recycle oil via line 33.

During normal operations, fresh feed stock enters line 32 and contacts recycle spent catalyst passing through standpipe 8. The recycle spent catalyst flow is controlled by slide valve 19 and the temperature in reaction zone 1, sufficient catalyst being recycled to vaporize the oil feed and deposit the contaminants in the feed thereon. The vapors produced in reaction zone 1 carry the recycled spent catalyst upward to reaction zone 2 where freshly regenerated catalyst is added to raise the temperature to a higher cracking level. The amount of freshly regenerated catalyst added is controlled by slide valve 31 and the temperature in reaction zone 2, sufficient catalyst being added to raise the temperature to the level needed to obtain the extent of conversion and the yield of hydrocarbon products desired.

The catalyst and hydrocarbon mixture exits reaction zone 2 through slots 15 into the separator zone 9 where the bulk of the spent catalyst flows downward to the stripper bed 11 located at the bottom of vessel 3. The remainder of the spent catalyst is entrained with the steam and hydrocarbon vapors and flows to cyclone separator 10 which returns the remainder of the spent catalyst to the stripper bed 11 via dipleg 16. The cyclone separator 10 directs the hydrocarbon vapors out of vessel 3 via plenum chamber 17 and outlet line 18.

Catalyst in dense bed 11 flows downward through stripping zone 4 over baffles 13 and is stripped by a counter-current flow of steam which enters the stripping zone via inlet line 14.

Stripped catalyst leaves vessel 3 through spent catalyst standpipes 5 and 8. Slide valve 19 controls the spent catalyst recycled to reaction zone 1, while slide valve 20 controls catalyst level 12 in vessel 3 and regulates the spent catalyst flow to regenerator 6. Air is fed to regenerator 6 via lines 23 and 24 to burn off the coke deposited in reaction zones 1 and 2 to produce freshly regenerated catalyst which flows through standpipe 7 at a rate controlled by slide valve 31 to the bottom section of riser reaction zone 2. Flue gas resulting from the oxidation of coke and catalyst entrained from regenerator bed 21 enters cyclone separator 27. Flue gas from the separator leaves the regeneration zone through plenum chamber 29 and exit line 30, while the separated catalyst is returned to regenerator bed 21 through dipleg 28.

Although single cyclones are shown in vessel 3 and regenerator 6, multiple cyclones in parallel and/or series flow can be used depending on the separation efficiency desired.

DESCRIPTION OF THE INVENTION

It is well known in the art that the performance of the catalytic cracking catalyst is highly dependent on the extent of build-up of coke on the catalyst. Increasing the level of coke on the catalyst not only reduces the activity but adversely changes the selectivity characteristics of the catalyst. One form of coke deposition results as a byproduct of the cracking reaction. As cracking proceeds to produce hydrogen rich low boiling compounds, some hydrogen deficienct high boiling compounds are also produced and these materials gradually polymerize to form a coke deposit on the catalyst. This is a normal type of coke deposition and is commonly referred to as "catalytic coke". However, the coke present on the catalyst during the cracking reaction can also appear from a number of other sources. The spent catalyst from the cracking reaction is regenerated with air to remove the coke and restore the desired cracking activity. The catalyst may be incompletely regenerated, leaving a catalyst returned to the cracking zone with a residual carbon content. This is commonly referred to as "carbon on regen cat". Another source of coke is from the reaction of oil feed components with metal contaminants on the catalyst. These contaminants, such as nickel and vanadium, dehydrogenate certain oil feed components with the result that these hydrogen deficient materials appear as coke on the catalyst. Another source of coke is from contaminants in the oil feed. Petroleum oils usually contain nitrogen compounds to the extent of 500 to 5000 ppm nitrogen. A portion of these compounds are basic in nature and they deposit on the catalyst by reacting with the acid sites on the cracking catalyst with by reacting with the acid sites on the cracking catalyst with the result that they destroy a significant portion of the activity of the catalyst. Coke on the catalyst also results from the presence of asphaltic type compounds difficult to vaporize and crack. Coke from these compounds is commonly referred to as "carbon residue" coke.

This invention substantially reduces the deleterious effects of the contaminants in the oil feed, such as basic nitrogen and carbon residue content. These compounds have a particularly adverse effect on catalyst performance in that they deposit immediately on contact of the oil with the catalyst. As a result of this rapid deposition on the catalyst, the activity and selectivity characteristics of the catalyst have been substantially adversely affected before any extensive amount of cracking has occurred. The effect of nitrogen, for example, was reported by S. E. Holtz, D. M. Nace, S. M. Jacob, V. W. Weekman, Jr., in *Ind. Eng. Chem Process Design & Development*, Vol. II, No. 2, 1972. A typical illustration of this effect is shown in Table 1 for the cracking of a Mid Continent gas oil at 1000° F, 6 cat/oil ratio, and a space velocity of 8 w/hr/w over a commercial FCC Zeolite catalyst. In this study, the deleterious effect of basic nitrogen was illustrated by cracking the virgin oil alone and with added basic nitrogen in the form of quinoline.

Table I

| Added Quinoline Basic $N_2$ - ppm | Total Basic Nitrogen - ppm | Conv Wt% | Reaction Velocity-$K_o$ |
|---|---|---|---|
| None | 300 | 75 | 42.7 |
| 1000 | 1300 | 62 | 22.5 |
| 2000 | 2300 | 55 | 16.3 |

The addition of 1000 ppm basic nitrogen as quinoline to the oil feed decreased the conversion from 75 to 62% and the reaction velocity constant from 42.7 to 22.5, equivalent to a 47% loss in the activity of the catalyst. The addition of an additional 1000 ppm basic nitrogen as quinoline decreased the conversion further from 62 to 55% and the reaction velocity constant from 22.5 to 16.3, equivalent to another 15% loss in the activity of the catalyst. The deleterious effect of basic nitrogen on conversion can be compensated for by increasing the severity of cracking by a number of alternative methods — by increasing cat/oil ratio, decreasing oil space velocity, or by increasing operating temperature. Although these methods will restore conversion to the original high level, it has been observed, however, that there is a disproportionate increase in gas and coke formation, with the result that the yield of desired gasoline product is lower than observed with the original feed to which no quinoline has been added.

It should be noted that the gas oil used in the studies of Table I contained 300 ppm of basic nitrogen impurity as fractionated from virgin Mid-Continent crude oil. It is apparent from the deleterious effects of added basic nitrogen in the form of quinoline that the cracking of the virgin gas oil itself is being impaired by the presence of the nitrogen contaminant appearing in its virgin form in the feed. Studies have been carried out by many investigators on methods to remove this nitrogen impurity from virgin and thermally cracked petroleum oils. Nitrogen can be removed as a sludge by sulfuric acid treatment of the oil, or it can be removed as ammonia by hydrogenation of the oil. It has been demonstrated by these investigators that the results from the cracking can be improved by removal of these nitrogen compounds. Both of these removal techniques, however, are very costly. As a result, it is common practice for oil refiners to crack these virgin oils without any treatment to remove the nitrogen contaminant, and to accept the adverse effects of this nitrogen contaminant on the activity and selectivity characteristics of the cracking reaction.

In this invention, the deleterious effects of contaminants in the oil feed are substantially reduced by contacting the oil feed first with low activity spent catalyst recycled from the stripping zone and then contacting this mixture with high activity regenerated catalyst. With this method of operation, the contaminants in the oil feed are essentially deposited on the spent catalyst with a minimum amount deposited on the freshly regenerated catalyst added subsequently to the cracking reaction mixture. Sufficient spent catalyst is recycled to essentially vaporize the oil feed but to carry out a minimum of cracking. The major portion of the desired cracking is then carried out with regenerated catalyst which has a high activity and which is not deactivated to any great extent by the contaminants in the oil feed. As a result, high conversion of the oil feed and selective cracking to the desired gasoline product is obtained. Typical operating conditions and results from the practice of my invention are shown in Table II.

Table II

| Feed<br>Contaminant - Basic N-ppm<br>Catalyst | | MC Heavy Gas Oil<br>300<br>Zeolite Type | | |
|---|---|---|---|---|
| Case No. | I | II | III | IV |
| Reactor Temperature ° F | | | | |
| Zone 1 | — | 900 | 850 | 860 |
| Zone 2 | 1000 | 1000 | 1000 | 960 |
| Feed Preheat Temp ° F | 570 | 600 | 600 | 600 |
| Regeneration Temp ° F | 1355 | 1355 | 1355 | 1355 |
| Spent Catalyst Recycle Temp ° F | — | 1000 | 1000 | 960 |
| Pressure psig | 10 | 10 | 10 | 10 |
| Cat/Oil | | | | |
| Spent Cat | — | 13.4 | 8.0 | 12.0 |
| Regen Cat | 6.3 | 6.3 | 6.3 | 4.9 |
| Oil Contact Time - Secs | | | | |
| Zone 1 | — | 1 | 1 | 1 |
| Zone 2 | 3 | 2 | 2 | 2 |
| Total | 3 | 3 | 3 | 3 |
| Conversion - Vol. % | 66.1 | 76.3 | 74.7 | 66.1 |
| Dry Gas - Wt. % | 1.0 | 1.7 | 1.6 | 0.8 |
| $C_3$ - Vol. % | 7.4 | 9.8 | 9.6 | 6.0 |
| $C_4$ - Vol. % | 13.2 | 17.6 | 17.3 | 10.8 |
| Gasoline - Vol. % | 55.8 | 62.0 | 60.5 | 59.3 |
| Cycle Oil - Vol. % | 33.9 | 23.7 | 25.3 | 33.9 |
| Coke - Wt. % | 5.0 | 5.0 | 5.0 | 4.4 |

Case I illustrates a conventional catalytic cracking operation carried out on a Mid-Continent heavy gas oil containing 300 ppm of basic nitrogen. Operation at a cracking temperature of 1000° F, pressure of 10 psig, a ratio of freshly regenerated catalyst to oil of 6.3 and an oil contact time of 3 seconds gave 66.1 Vol. % conversion of the oil and yield of gasoline boiling from pentanes to 430° F cut point of 55.8 Vol. %. Cases II, III and IV are operations in which the processing method of my invention is carried out. In these cases, the vertical riser reactor of Case I is divided into two parts, a bottom reaction zone 1 in which the oil contact time is about 1 second and an upper reaction zone 2 in which the oil contact time is about 2 seconds, the total oil contact time being the same 3 seconds of the base Case I. In all four cases, the hydrocarbon oil feed is fed to the bottom of reaction zone 1 with recycled spent catalyst withdrawn from the spent catalyst stripping zone. Steam, in an amount equivalent to 2 Wt. % of the oil, is added to aid in the atomization and vaporization of the oil in the bottom reaction zone. The vaporized oil, steam and recycled spent catalyst flow upward to reaction zone 2 where freshly regenerated catalyst is added. The cracking conditions in reaction zone 2 are controlled to give the desired conversion of the oil feed and yield of desired products.

In case II, the cracking temperature in reaction zone 2 was held at 1000° F, the same as in base Case I. Spent catalyst from the stripping zone was recycled to the base of the riser reactor and contacted with the hydrocarbon feed in reaction zone 1, the amount of spent catalyst recycled being sufficient to hold a 900° F temperature at the outlet of the reaction zone. The ratio of recycled spent catalyst to oil feed was 13.4 by weight. The mixture of hydrocarbon feed, added steam, and recycled spent catalyst then contacted in reaction zone 2 an amount of freshly regenerated catalyst to hold a 1000° F temperature at the outlet of reaction zone 2. The ratio of freshly regenerated catalyst to oil feed was 6.3 by weight. The total oil contact time in the riser reaction zones 1 and 2 was the same as in the base Case I. In the practice of my invention, conversion of the oil feed increased from 66.1 to 76.3% by volume and the yield of desired gasoline increased from 55.8 to 62.0% by volume.

Case III, in the practice of my invention, was similar to Case II, except that the amount of spent catalyst recycled from the spent catalyst stripping zone was decreased so that the temperature at the outlet of reaction zone 1 was 850° F instead of 900° F. The ratio of recycled spent catalyst to oil feed was decreased from 13.4 to 8.0 by weight. The practice of my invention in this instance increased conversion of the oil feed from 66.1 to 74.7% by volume and increased gasoline yield from 55.8 to 60.5% by volume. The effect of decreasing the temperature in reaction zone 1 from 900° to 850° F was slight.

In case IV of the practice of my invention, the outlet temperature of the cracking reaction zone was decreased to 960° F to decrease the conversion of the oil feed to the same level as the conventional cracking base Case I. In Case IV, the spent catalyst recycled from the stripping zone to the inlet of reaction zone 1 was controlled to give a 860° F temperature at the outlet of this reaction zone. The ratio of recycled spent catalyst to oil feed was 12.0 by weight. The mixture of vaporized oil feed, added steam, and recycled spent catalyst flowing upward through reaction zone 1 was then contacted with freshly regenerated catalyst in an amount sufficient to obtain the desired conversion of 66.1% by volume. The ratio of freshly regenerated catalyst to oil feed was 4.9 by weight and the temperature at the outlet of reaction zone 2 was 960° F. The gasoline yield in Case IV was 59.3% by volume, 3.5% more by volume than the 55.8% by volume obtained at the same conversion level as in the conventional cracking Case I.

It is apparent from the above that the practice of my invention will allow higher conversion of the oil feed and higher yields of desired hydrocarbon products or, even at the same conversion of the oil feed, higher yields of desirable gasoline product. These benefits result from the fact that, in the practice of my invention, the undesirable contaminants in the oil feed — in this particular case, basic nitrogen compounds — are deposited on the recycled spent catalyst rather than on the freshly regenerated catalyst which occurs in conventional catalytic cracking of petroleum oils as illustrated in Case I of Table II. Since these undesirable contaminants in the oil feed are not deposited on the freshly regenerated catalyst, the catalyst maintains a higher activity level and gives a more selective product distribution — specifically, a higher gasoline yield.

The benefits of the practice of my invention will be realized when employing any of the conventional cracking catalysts, such as silica-alumina, silica-magnesia, acid treated clay, or the zeolite-containing catalysts. The modern zeolite-containing catalysts are preferred because their high activity and low coke forming tendency results in higher conversion and higher yields of more valuable products than the older amorphous type catalysts. The zeolite-containing catalysts, however, are more sensitive catalysts, losing their activity and selectivity characteristics more rapidly than the amorphous type catalysts as coke is deposited on the catalyst surface. The zeolite-containing catalysts are also known to be sensitive to the effect of residual carbon on regenerated catalyst. Spent catalyst, after stripping, is passed to a regenerator where coke deposited in the cracking reaction zone is oxidized and removed from the catalyst in order to restore the activity of the catalyst. In this regeneration step, a certain amount of residual carbon remains on the catalyst returned to the cracking zone. Depending on the regeneration conditions employed — the volume of catalyst bed, the temperature and the excess oxygen employed — the amount of residual carbon remaining on the regenerated catalyst can be as low as 0.05% by weight or as high as 1% by weight. The performance of the amorphous type catalysts was not seriously affected by high residual carbon content of regenerated catalyst, it being common practice to hold this level of carbon content between 0.4 and 1% by weight of the regenerated catalyst. With the introduction of the zeolite-containing catalysts, it was soon learned that only a fraction of the intrinsic activity of the catalyst was being realized when the residual carbon content of the regenerated catalyst was held at these high levels. As a result, regeneration conditions where modified when employing zeolite-containing catalysts so that the residual carbon content of regenerated catalyst was held below about 0.4%, more commonly below about 0.2%, and more preferably held at about 0.05% by weight.

As our background information on the performance of zeolite-containing catalysts has developed, it has become increasingly apparent that the activity and selectivity characteristics of these type catalysts are markedly affected by the presence of coke deposited on the catalyst from all sources — the byproduct of the cracking reaction, residual carbon from incomplete regeneration of the catalyst, absorbed basic nitrogen compounds, unvaporized type compounds with a high carbon content, and inorganic metallic compounds. Many of these sources are coke precursors which appear as contaminants in the oil feed. In the practice of my invention, the effect of these contaminants is minimized by depositing them on the recycled spent catalyst rather than on the freshly regenerated catalyst.

The feed stocks employed in the practice of my invention can vary from light distillates to vacuum gas oils, or can be solvent extracted oils, reduced crudes or total crude oils. The advantages for the practice of my invention are the greatest when operating with the poorer quality feed stocks. The common feed to catalytic cracking contains 200–400 ppm basic nitrogen content and less than 0.5 Wt. % carbon residue content. Feed stocks from certain west coast and foreign crude oils, however, may contain more than 1000 ppm basic nitrogen content. Solvent decarbonized oils, reduced crudes and crude oils may contain carbon residue contents of 1 to 10 Wt. % or higher. In the conventional cracking of oils high in basic nitrogen and carbon residue contents, the conversion level is low due to the severe deactivation of the freshly regenerated catalyst resulting from the rapid deposition of these materials on the catalyst. In the practice of my invention, this severe deactivation of the regenerated catalyst is greatly minimized since the oil feed contaminants will be deposited on the recycled spent cracking catalyst. The bulk of the cracking of the oil feed will then be accomplished by the freshly regenerated catalyst which will not be contaminated to any great extent by the basic nitrogen and carbon residue type compounds in the feed.

The contacting of the fresh feed and recycled spent catalyst is preferably carried out in a short time riser reaction zone. The term "short time riser reaction zone" as used herein refers to a fluid catalytic cracking zone in which the catalyst is dispersed as a dilute phase in the hydrocarbon vapor; there is concurrent flow of catalyst and hydrocarbon vapor with minimum back mixing of gasoline product; and the vapor and catalyst residence time is short. The reaction conditions employed in the primary cracking of the oil feed with recycled spent catalyst include temperatures between about 800° and 950° F, pressures between about atmospheric and 100 psig, ratio of recycled spent catalyst to oil between about 5 and 30, and oil contact times less than 5 seconds. A diluent, such as steam or a light hydrocarbon fraction, may be added to lower the partial pressure of the hydrocarbon feed. Although the riser is preferably set in a vertical position with the upward vapor velocity in the riser between 5 and 60 ft./sec., the contacting of feed and recycled spent catalyst can occur in a horizontal or down flow reaction zone. Following the contacting of the feed and recycled spent catalyst in the primary reaction zone, the admixture flows to a second reaction zone where freshly regenerated catalyst is added to raise the mixture to reaction temperature and to obtain the desired final conversion of the feed. The reaction conditions employed in the second reaction zone include temperature between about 900° and 1100° F, pressures between about atmospheric and 100 psig, ratios of freshly regenerated catalyst to oil between about 2 and 15, and oil contact times less than 15 seconds. It is also desirable to carry out the secondary cracking reaction in a riser reaction zone though it may be necessary to superimpose a dense fluid bed reaction zone on top of the riser reaction zone section to obtain the desired extent of conversion of the hydrocarbon feed.

The freshly regenerated catalyst added to the secondary reaction zone is produced in a regeneration zone where coke deposited on the catalyst in the primary and secondary reaction zones is oxidized from the spent catalyst with an oxygen containing gas. The spent catalyst feed to the regenerator is a mixture of the recycled spent catalyst which has flowed through the primary and secondary reaction zones and the freshly regenerated catalyst which has flowed through only the secondary reaction zone. In the flow through the reaction zones, the recycled spent catalyst has had additional coke deposited on the catalyst primarily in the form of the basic nitrogen, carbon residue and inorganic metal compounds present as contaminants in the oil feed, while the freshly regenerated catalyst has had coke deposited on the catalyst primarily as a catalytic coke resulting from the extensive cracking of the feed to the conversion level desired. The amount of coke deposited on the spent catalyst is usually about 1% by weight, though it could be as low as 0.5% by weight and as high as about 2.5% by weight, if a feed high in carbon residue content is cracked. In the regeneration of the spent catalyst, a small amount of residual carbon remains on the catalyst. The amount is usually less than 0.4%, preferably as low as 0.05% by weight.

The regeneration of the spent catalyst is usually carried out in a dense bed which is maintained in the lower section of the regeneration zone. Air, or other oxygen containing gas, is fed to the bottom of the regenerator through a distributor grid plate, a multiple pipe distributor or a multiple ring distributor. The spent catalyst is fed directly to the regenerator catalyst bed via a standpipe, or is carried by an oxygen containing gas to the bottom of the regenerator catalyst bed. The flue gas leaving the regenerator catalyst bed flows through a disengaging zone positioned above and in connection with the dense bed. A major portion of the catalyst entrained from the dense bed with the flue gas settles out in the dilute phase disengaging zone and returns to the dense bed. The catalyst which continues to be entrained with the flue gas is recovered in one or more cyclone separators located in the dilute phase at the top of the regenerator vessel. Catalyst recovered in the cyclones is returned via diplegs to the regenerator bed. The oxidizing conditions in the regenerator bed include temperatures between about 1100° and 1500° F, pressures from about atmospheric to 100 psig, and catalyst residence times from about 1 to about 10 minutes.

The spent catalyst before flowing to the regenerator is effectively separated from the hydrocarbon reaction products. This can be accomplished in a number of ways. As shown in the drawing, the mixture of spent catalyst and hydrocarbon vapors can discharge from the riser reaction zone directly into a disengaging vessel where the bulk of the catalyst settles into a stripping zone where the catalyst flows countercurrent to the stripping medium, usually steam, in a manner that absorbed and interstitial hydrocarbons are stripped from the catalyst prior to its flow to the regeneration zone or return to the riser reaction zone for contacting with the oil feed. The spent catalyst for return to the bottom of the riser may be withdrawn from any depth of this stripping zone. Usually it will be withdrawn near the bottom of the stripping zone, but in some cases it is more desirable to withdraw it from near the top of the stripping zone. The entrained hydrocarbon gas and stripping steam from the stripper join the hydrocarbon effluent from the riser reaction zones. These vapors contain some fine entrained catalyst which is recovered in one or more cyclone separators located in the top of the dilute phase separator zone. Catalyst separated in the cyclones is returned via diplegs to the top of the stripper bed located in the bottom section of the separator vessel. The stripping is accomplished in a baffled zone or other apparatus in which efficient counter-current contacting of stripping steam and catalyst is accomplished.

A portion of the stripped spent catalyst flows to the regenerator for removal of the coke deposit to produce freshly regenerated catalyst. Another portion of the stripped spent catalyst is recycled to the inlet of the riser reaction zone for contacting with the oil feed, whereby certain contaminants in the feed, such as basic nitrogen, carbon residue and inorganic metal type compounds, are deposited on the spent catalyst. The mixture of spent catalyst and incompletely reacted hydrocarbons are then contacted with freshly regenerated catalyst in a subsequent reaction zone to obtain the ultimate desired conversion of the oil feed. The amount of spent catalyst recycled to the primary reaction zone is readily controlled by the slide valve in the recycle spent catalyst standpipe as set by the temperature at the outlet of this zone. The amount of freshly regenerated catalyst added at the bottom of the secondary reaction zone to the effluent mixture of spent catalyst and hydrocarbon from the primary reaction zone is similarly readily controlled by the regenerated catalyst slide valve and the temperature at the outlet of the secondary reaction zone.

I claim as my invention:

1. A fluid catalytic cracking process in which the virgin hydrocarbon feed is contacted in succession with a recycled spent catalyst prior to any contact with regenerated catalyst and then without separation of recycled spent catalyst and oil contact with a freshly regenerated catalyst to produce an improved yield structure, which process comprises the steps of:

a. contacting a hydrocarbon feed in a primary short time dilute phase riser reaction zone with a recycled spent catalyst stream from a spent catalyst stripping zone in an amount sufficient to vaporize the oil feed and deposit nitrogen and carbon residue type contaminants in the feed on the spent catalyst;

b. passing the feed and spent catalyst in admixture to a secondary riser reaction zone where freshly regenerated catalyst is added in an amount sufficient to obtain the desired conversion of and yield and quality of products from the oil feed;

c. discharging the mixture into a separation zone to effect separation of the products and unreacted feed from the spent catalyst;

d. recovering product and unreacted feed and passing spent catalyst from said separation means into a spent catalyst stripping zone to remove absorbed and interstitial hydrocarbons to form stripped spent catalyst containing coke;

e. passing a portion of stripped spent catalyst from the stripping zone to the primary reaction zone as the recycle spent catalyst stream of step (a) above at a rate sufficient to vaporize the oil feed and deposit nitrogen and carbon residue type contaminants in the feed on the recycled spent catalyst;

f. passing simultaneously a second portion of stripped spent catalyst from the stripping zone into a regeneration zone wherein coke is oxidized from the said catalyst to produce freshly regenerated catalyst;

g. passing freshly regenerated catalyst from said regeneration zone to the secondary reaction zone of step (b) above at a rate sufficient to obtain the desired conversion of and yield and quality of products from the oil feed.

2. The process of claim 1 further characterized in that the catalytic cracking conditions in the primary reaction zone of step (a) include a temperature within the range of about 800° to 950° F, a pressure within the range of about atmospheric to about 100 psig, and a hydrocarbon residence time of less than 5 seconds.

3. The process of claim 1 further characterized in that the catalytic cracking conditions in the secondary reaction zone of step (b) include a temperature within the range of about 900° to 1100° F, a pressure within the range of about atmospheric to about 100 psig, and a hydrocarbon residence time of less than 15 seconds.

4. The process of claim 1 further characterized in that the catalytic cracking conditions include the presence of a diluent to reduce the partial pressure of the hydrocarbon feed.

5. The process of claim 1 further characterized in that the oxidizing conditions in the regeneration zone include a temperature within the range of about 1100° to 1500° F, a pressure from about atmospheric to about 100 psig, and a catalyst residence time of from about 1 to about 10 minutes.

6. The process of claim 1 further characterized in that the regeneration zone comprises a dense bed of catalyst with a dilute phase positioned above and in connection with it.

7. The process of claim 1 in which the spent catalyst recycled to the primary reaction zone of step (a) above is withdrawn from the top section of the stripping zone.

8. The process of claim 1 in which the portion of the hydrocarbon feed which is recycled from the recovery system as unreacted feed or as a product of the cracking reaction is fed to the secondary reaction zone along with the freshly regenerated catalyst.

9. A fluid catalytic cracking process in which the virgin hydrocarbon feed is contacted in succession with a recycled spent catalyst prior to any contact with regenerated catalyst and then without separation of recycled spent catalyst and oil contact with a freshly regenerated catalyst to produce an improved yield structure which process comprises the steps of:
 a. contacting a hydrocarbon feed in a primary short-time dilute phase riser reaction zone with a recycled spent catalyst stream from a spent catalyst stripping zone at a temperature within the range of about 800° to 950° F, a pressure within the range of about atmospheric to about 100 psig, and a hydrocarbon residence time of less than 5 seconds;
 b. passing the feed and spent catalyst in admixture to a secondary riser reaction zone where it is contacted with freshly regenerated catalyst at a temperature within the range of about 900° to 1100° F, a pressure within the range of about atmospheric to about 100 psig, and a hydrocarbon residence time of less than 15 seconds;
 c. discharging the mixture into a separation zone to effect separation of the products and unreacted feed from the spent catalyst;
 d. recovering product and unreacted feed and passing spent catalyst from said separation means into a spent catalyst stripping zone to remove absorbed and interstitial hydrocarbons to form stripped spent catalyst containing coke;
 e. passing a portion of stripped spent catalyst from the stripping zone to the primary reaction zone as the recycle spent catalyst stream of step (a) above at a rate sufficient to vaporize the oil feed and deposit nitrogen and carbon residue type contaminants in the feed on the recycle spent catalyst;
 f. passing simultaneously a second portion of stripped spent catalyst from the stripping zone into a regeneration zone wherein coke is oxidized from said catalyst to produce freshly regenerated catalyst at a temperature within the range of about 1100° to 1500° F, a pressure from about atmospheric to about 100 psig, and a catalyst residence time of about 1 to about 10 minutes;
 g. passing freshly regenerated catalyst from said regeneration zone to the secondary reaction zone of step (b) above at a rate sufficient to obtain the desired conversion of and yield and quality of products from the oil feed.

10. The process of claim 9 further characterized in that the catalytic cracking conditions include the presence of a diluent to reduce the partial pressure of the hydrocarbon feed.

* * * * *